Sept. 9, 1958  D. SCIAKY  2,851,584
METHOD AND APPARATUS FOR MONITORING WELDS
Filed Nov. 8, 1956  6 Sheets-Sheet 2

INVENTOR.
David Sciaky,
BY
Wilkinson Huxley Byron & Hume
attys.

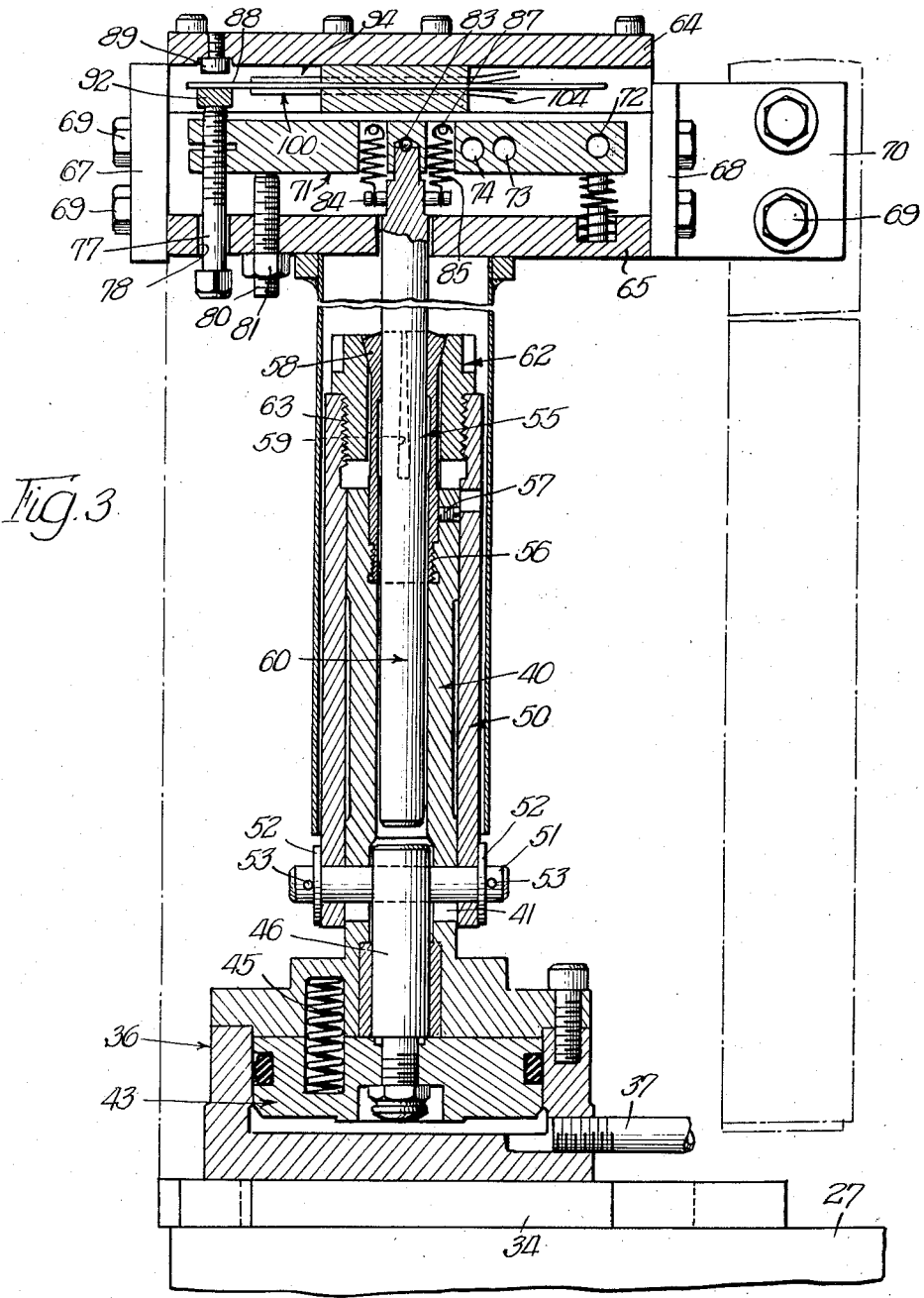

Sept. 9, 1958           D. SCIAKY           2,851,584
METHOD AND APPARATUS FOR MONITORING WELDS
Filed Nov. 8, 1956           6 Sheets-Sheet 4
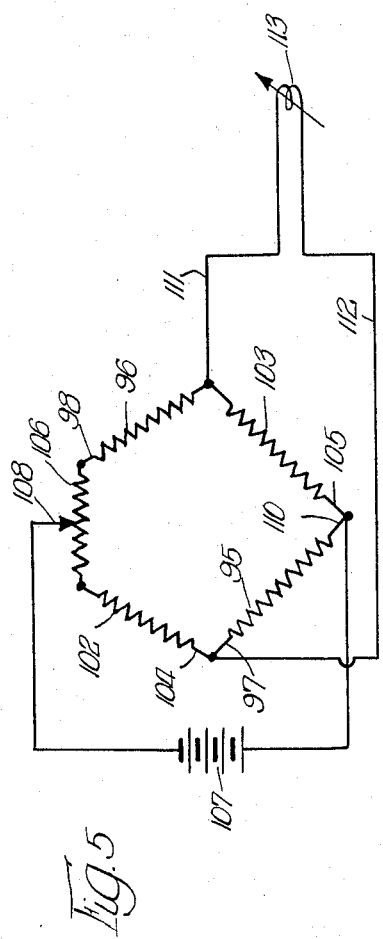
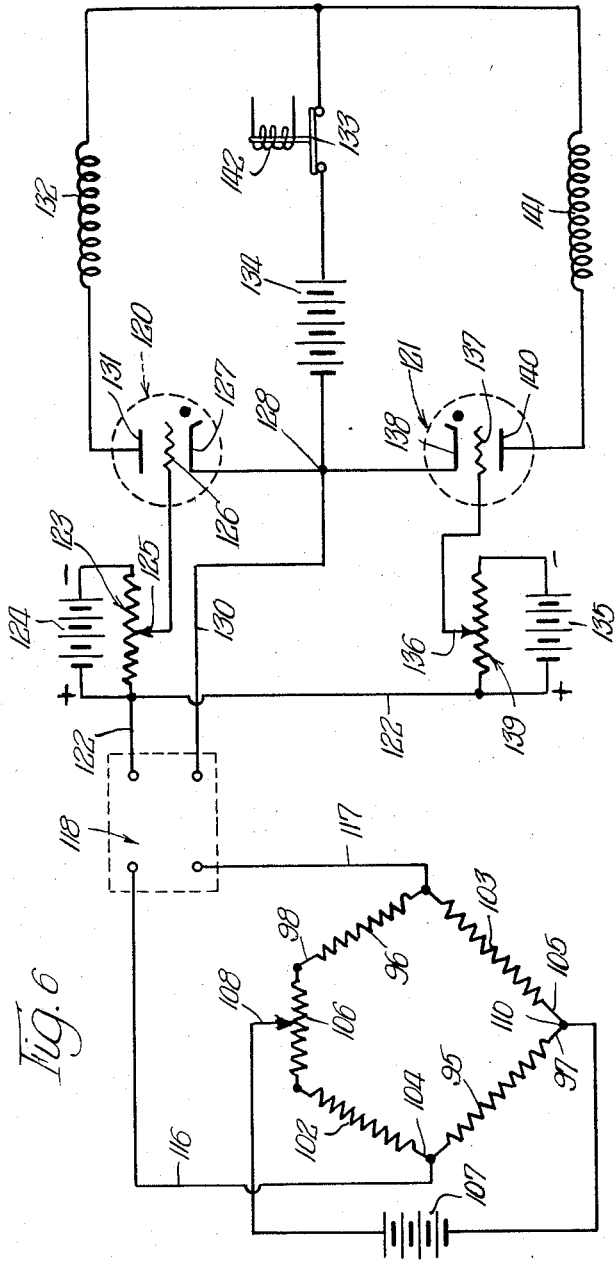
INVENTOR.
David Sciaky,
BY
Wilkinson Huxley Byron & Hume
Attys.

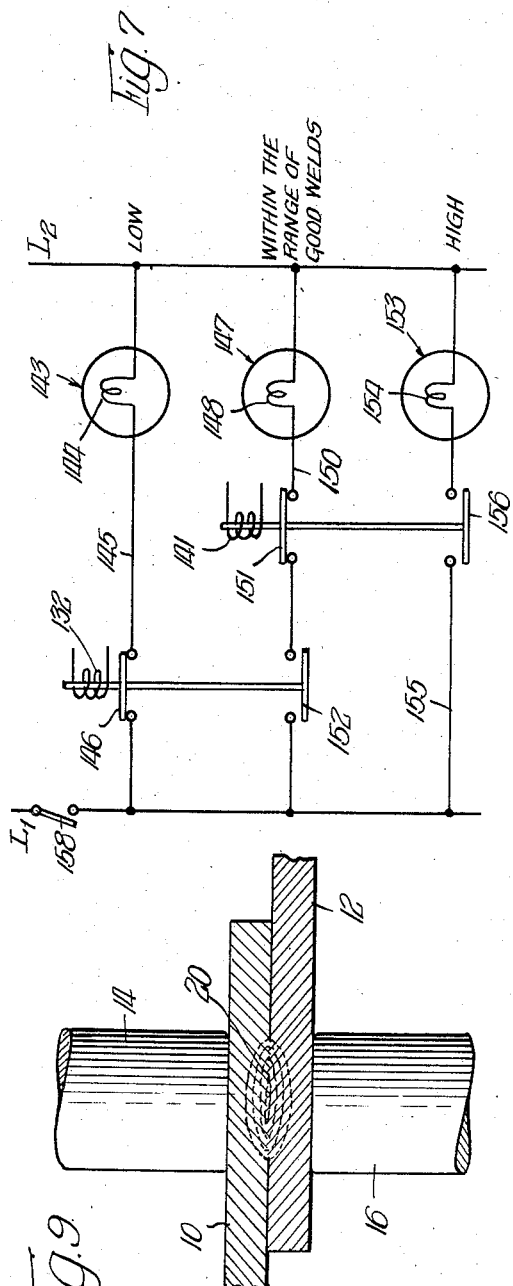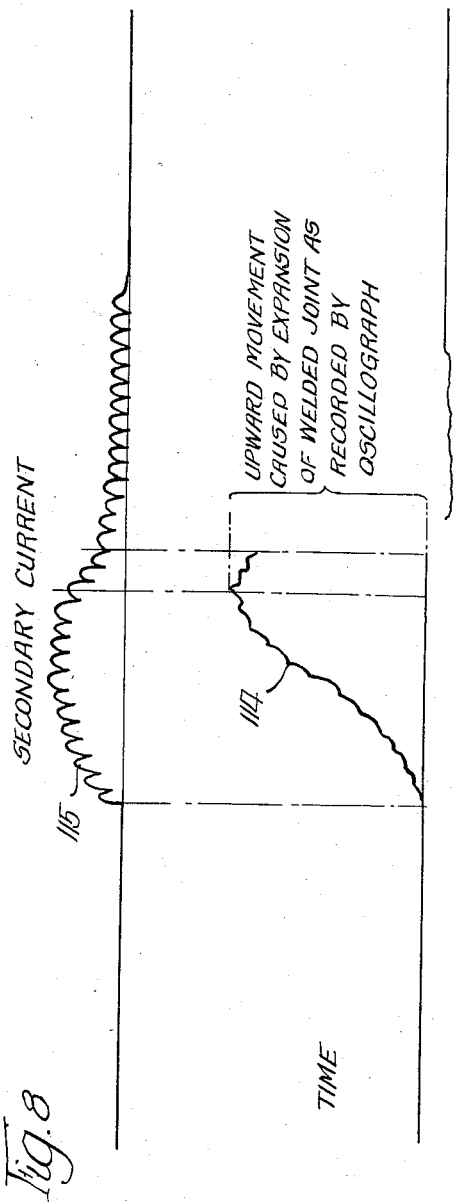

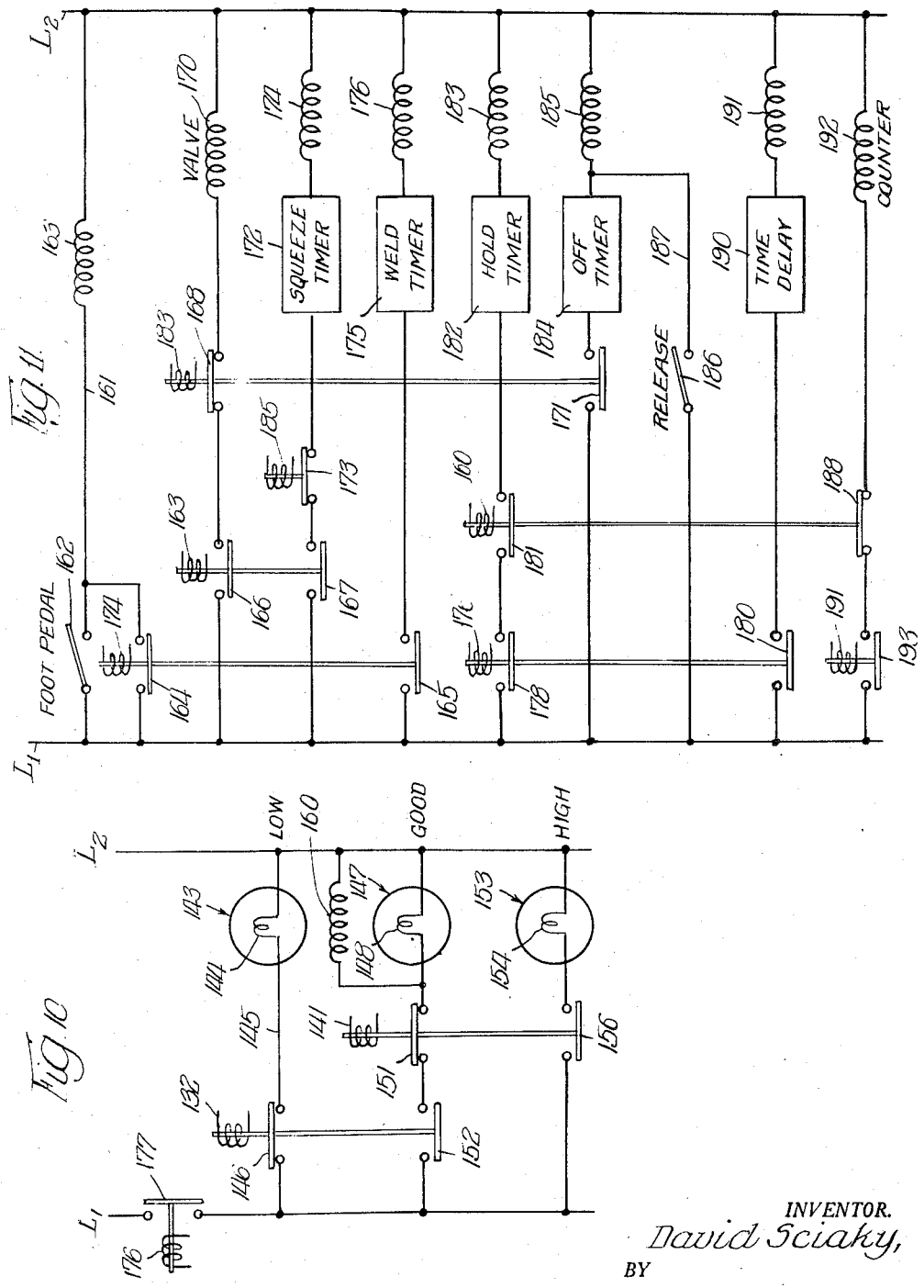

United States Patent Office 2,851,584
Patented Sept. 9, 1958

2,851,584

METHOD AND APPARATUS FOR MONITORING WELDS

David Sciaky, Chicago, Ill., assignor to Welding Research, Inc., Chicago, Ill., a corporation of Illinois Application November 8, 1956, Serial No. 621,108

8 Claims. (Cl. 219—86)

The invention relates to apparatus for determining the quality of resistance welded joints approximately simultaneously with their formation by the measurement of a physical phenomenon which is associated with the inherent characteristics of the material being welded and which is also associated with the physical process of creating a resistance weld, and independent of many variables of the welding process.

Resistance welding is the most economical means known for the joining of metals in repetitive production operations. The economy of spot, roll-spot, and seam welding of aluminum alloys has been demonstrated by the air frame manufacturers as well as other industries. Nevertheless these processes are utilized rather sparingly in aircraft manufacture, being employed primarily for non-critical assemblies. This situation arises from the fact that a spot weld, unlike a rivet or a bolt, is rather intangible. It is an invisible bond between two sheets or plates of metal. The weld itself can not be seen, and there is no external manifestation of the process which serves as a reliable indication that a good weld has been produced. Furthermore no economical and dependable non-destructive testing method exists for either qualitative or quantitative evaluation of resistance welded assemblies.

In the production of a resistance spot-weld, the column of metal clamped between the electrodes is heated by flow of current through the same and is thus caused to expand until a critical temperature is reached, where the unit electrode force equals the yield point of the material at that temperature. As heating progresses the mass of metal, which later forms the weld nugget, begins to melt and as melting of the same takes place the change in state is accompanied by a considerable increase in volume.

The weld may now be considered as a volume of molten metal contained in and completely filling a vessel. However, the molten metal is restrained in all directions by the solid walls of the material surrounding it. The liquid weld metal therefore exerts a force on all the walls of its vessel and since the largest surface of the vessel is in the plane of the electrodes the resultant force is sufficient to cause an additional expansion of the metal clamped between the electrodes, all of which produces upward movement of the movable electrode until equilibrium is again attained. It is reasonable that the magnitude of the upward movement of said movable electrode should be related to the volume of the melted metal forming the weld nugget and therefore to the strength of the welded joints.

Accordingly an object of the invention is to provide apparatus for measuring the movement of the reciprocating electrode of a resistance welding machine and which will translate said movement into an electrical impulse that can be employed in any convenient manner as an indicator of the strength and quality of the welded joint.

Another object of the invention is to provide apparatus for measuring the volumetric expansion of the mass of molten metal comprising the weld nugget as exhibited in the vertical upward movement of the movable electrode during the welding process and which apparatus will detect a predetermined minimum and a predetermined maximum of movement and indicate the same by lighting a light to thus warn the operator that the weld is either within the range of good welds or outside said range.

Another object resides in the provision of apparatus for the purposes described which will include a gauging device adapted to be affixed to a resistance welding machine and which will be so constructed and arranged as to actuate a plurality of strain gauges upon upward movement of the reciprocating electrode during the welding process whereby to provide an electrical impulse proportional to the magnitude of said upward movement.

A further object is to provide a gauging device embodying strain gauges for the purposes described and which device will be normally inoperative to permit up and down movement of the reciprocating electrode of the welding machine in a manner which will not actuate the strain gauges, said device, however, being automatically rendered operative immediately in advance of the welding operation so that the strain gauges will be proportionately actuated in response to the volumetric expansion of the mass of metal forming the weld nugget.

A still further object of the invention is to provide novel apparatus for measuring the upward movement or displacement of the movable electrode during the welding process and which will translate said movement into an electrical impulse the magnitude of which can be related to the quality of the welded joint and wherein said operations can be synchronized with the various steps in the complete welding process.

With these and other objects in view, the invention may consist of certain novel features of construction and operation as will be more fully described and particularly pointed out in the specification, drawings and claims appended hereto.

In the drawings, which illustrate an embodiment of the invention and wherein like reference characters are used to designate like parts—

Figure 3 is a vertical sectional view through the gauging device similar to Figure 2 but showing the collet in operative relation with the associated push rod;

Figure 5 is a schematic diagram showing an electrical circuit including the strain gauges as elements thereof and which are so connected as to deliver their electrical output to a sensitive galvanometer such as may be mounted in a recording oscillograph;

Figure 6 is a schematic diagram of another electrical circuit including the strain gauges as elements thereof and wherein the output is caused to selectively actuate minimum and maximum relays, depending on whether the output is above a predetermined minimum or maximum;

Figure 7 is a diagrammatic illustration of another electrical circuit adapted to be energized through the relays of Figure 6 to cause the energization of certain lights whereby to give the operator an indication as to the strength of the welded joints;

Figure 8 is an oscillograph illustrating a typical secondary current for a resistance welding machine and showing the degree of upward movement of the movable electrode in millimeters for a typically good weld;

Figure 9 is a sectional view taken through a resistance welded joint and which illustrates the shape and comparative size of the weld nugget for a satisfactory weld;

Figure 10 is a diagrammatic illustration of an electric circuit similar to that of Figure 7 but which includes certain relay means in shunt relation with the lamp for indicating a good weld; and Figure 11 is a diagrammatic illustration of the circuit connections for a conventional welder modified by the inclusion of relay energized locking means for locking the welder against operation in the event of a bad weld.

Figure 1:
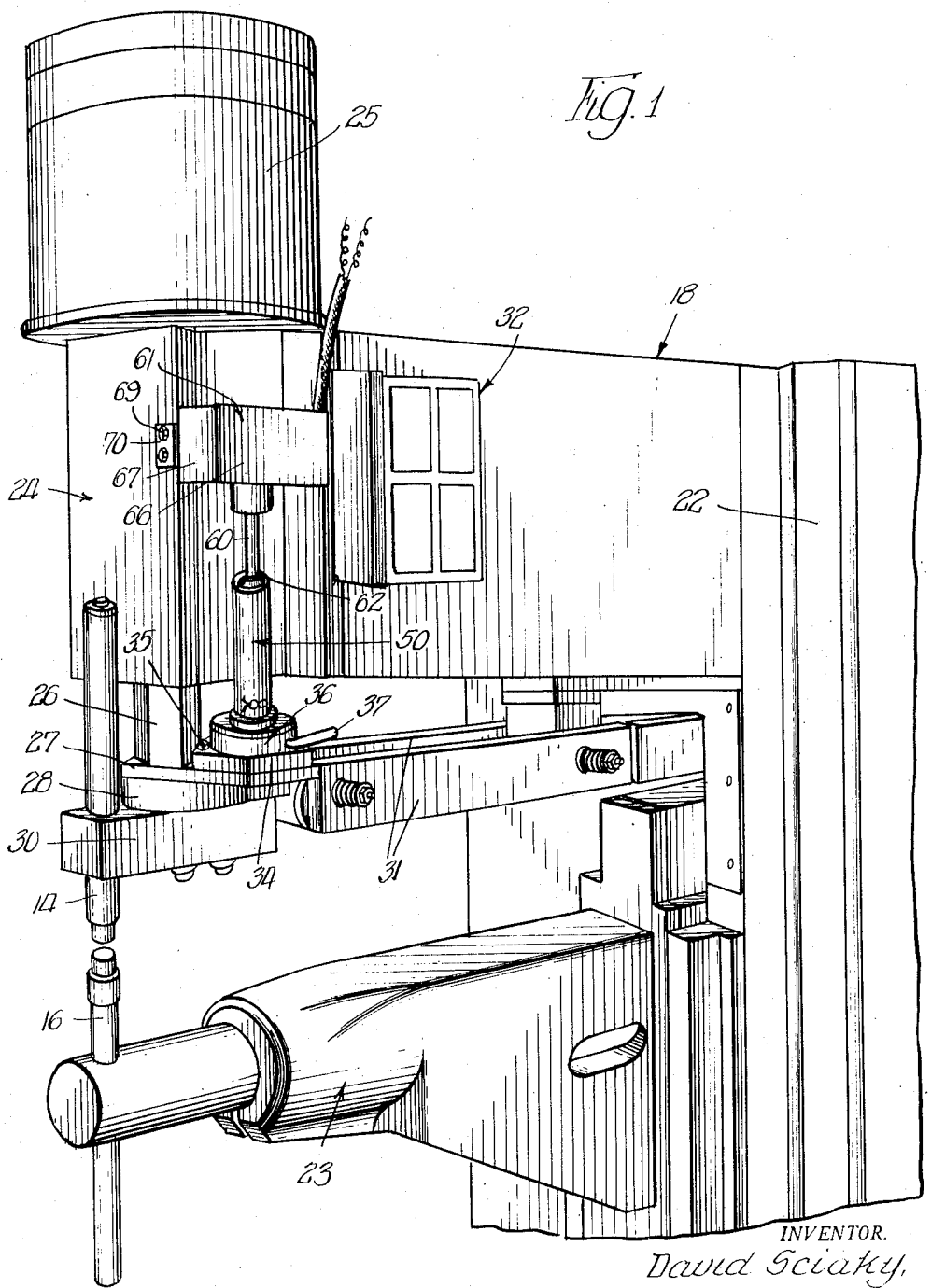
Figure 1 is a fragmentary view in perspective of a welding machine showing the same equipped with apparatus capable of measuring the upward movement of the movable electrode, all in accordance with the present invention.

In producing a spot-weld, two overlapped sheets of metal such as 10 and 12, Figure 9, are located between the electrodes 14 and 16 of a resistance welding machine generally indicated by numeral 18, Figure 1. The electrodes come together and apply a predetermined force to the overlapped metal sheets, and then an electric current is passed through the material by the electrodes and as the metal begins to heat its temperature rises and the same expands. The maximum temperature is reached at the interface since the contact resistance in this area is the highest resistance encountered in the current flow path. As the heat progresses a certain quantity of the metal is melted and the same forms the weld nugget 20. The cross-sectional shape of the weld nugget 20, taken vertically through its central axis, is shown in Figure 9. During the heating cycle the weld metal is constrained by the mass of cold metal surrounding it and by the electrode force. Taking these factors into consideration, the maximum linear expansion of the weld metal while it is being heated to the melting point can be computed, and it is also possible to compute the volumetric expansion of the weld nugget caused by the change in state of the metal from solid to liquid, all of which will cause the movable electrode 14 to move upwardly. In accordance with the invention this upward movement is translated into an electrical impulse, the magnitude of which is measured and correlated in a manner to indicate the quality of the welded joint. For a more particular discussion in connection with the foregoing, reference is made to the pending application of William J. Farrell, Serial No. 521,810, filed July 13, 1955, and entitled Method and Apparatus for determining the Quality of Resistance Welded Joints.

Figure 2:
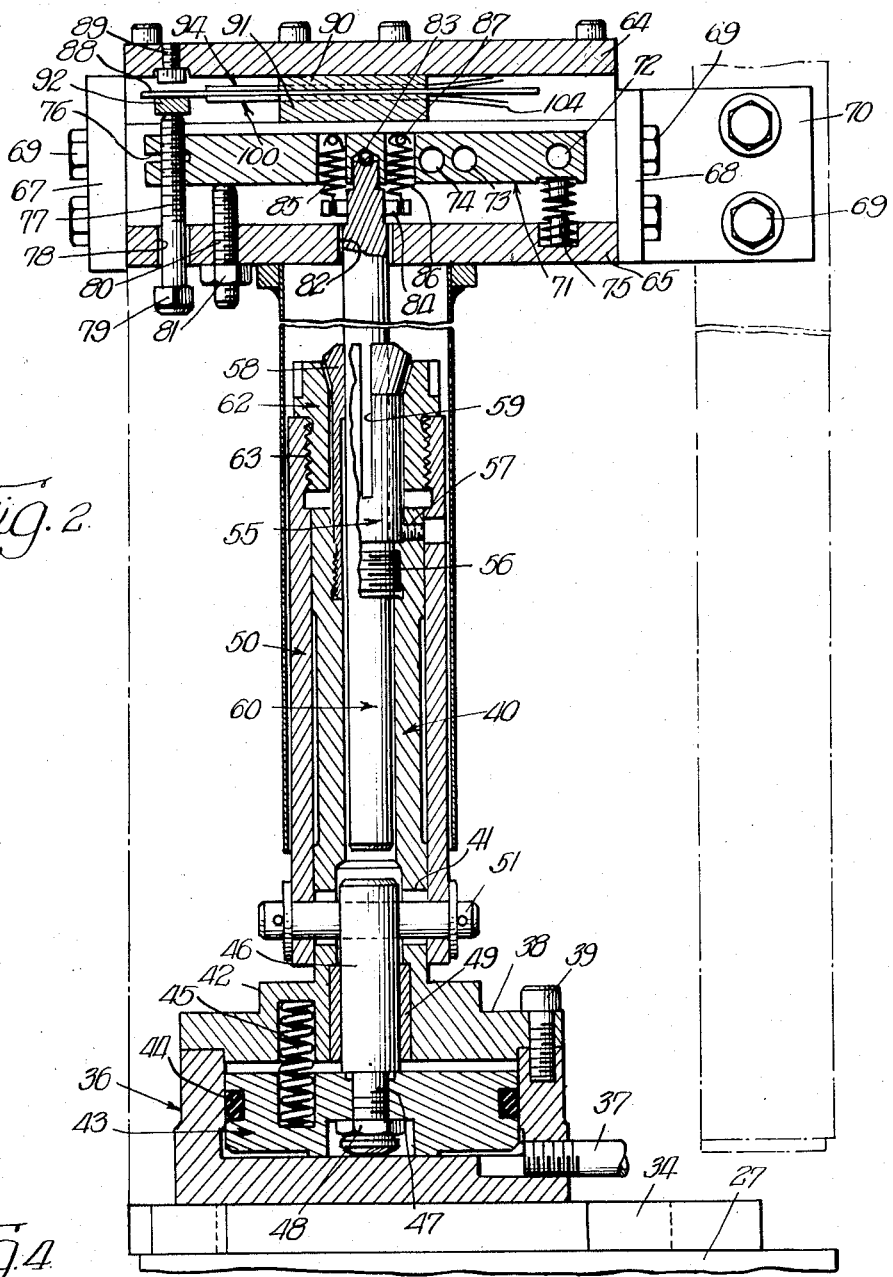
Figure 2 is a vertical sectional view showing the constructional details of the gauging device with the collet having an inoperative relation with the associated push rod.

The welding machine 18 selected for illustrating the present invention includes frame structure 22 which provides a lower electrode arm or supporting member 23 for the lower fixed electrode 16 and an upper arm 24 which carries the cylinder head 25. A piston, not shown, is adapted to reciprocate within the cylinder head 25 and the plunger 26 is suitably secured to the piston so as to move therewith. As shown in Figure 1, the plunger 26 depends from the lower end of the upper arm 24 and has suitably secured thereto the horizontal plate 27, the spacing member 28, and the electrode carrier 30. The upper movable electrode 14 is suitably fixed to the electrode carrier 30 and the same is positioned in exact vertical alignment with electrode 16 for clamping the workpieces such as 10 and 12 to be welded. A high amperage current of low voltage is delivered to the upper electrode 14 by the current conducting bars 31 which connect with the secondary of the welding machine at their right hand end and with plate 27 at their left hand end. Through the spacing member 28 and member 30, the said current carrying bars have electrical connection with the upper electrode 14. The numeral 32 indicates the control box for the welding machine and which contains the various switches and automatic controls for initiating operation of the welding machine and for automatically timing the various steps in the welding process as the squeeze interval, the welding time, the hold time, and the off period. Before operation of the resistance welding machine of Figure 1, it is necessary to space the electrodes to permit insertion of the workpieces. Accordingly, the desired upward movement is imparted to member 30, spacing member 24 and the horizontal plate member 27 by movement of plunger 26 and which is effected by supplying a pressure medium to the cylinder head 25 below the piston therein, all as is well understood in conventional welding procedure. Following this upward movement the workpieces are placed between the electrodes and the initial step in the welding process is to effect downward movement of movable electrode 14 in order to clamp the workpieces between the electrodes with a clamping pressure which is of considerable magnitude since it is desired to effect as good electrical contact as possible at the interface of the workpieces. This maximum pressure is reduced to a predetermined extent according to well known methods and when this reduced pressure becomes stabilized the welding current is applied. This constitutes a reference point from which upward movement of the movable electrode 14 is measured by apparatus such as shown in Figures 2 and 3, part of which is fixed to the horizontal plate 27 and part to the upper arm 24 of the welding machine. Said gauging structure will now be described in detail.

The plate 34 is suitably secured to horizontal plate 27 by bolts such as 35 and said plate in turn supports the cylinder 36. The cylinder 36 forms the base of the gauging device of Figures 2 and 3, and it will be understood that said base has a supply pipe such as 37 threadedly connected thereto and additionally has a top closure 38 releasably secured to said base by screws 39. The top closure 38 has the tubular push rod support 40 formed integral therewith and said support extends vertically upward from the center of the top closure and is provided with the vertically extending slots 41 located diametrically opposite each other adjacent the base of the support and immediately above the flange 42 of said top closure. A piston 43 is adapted to reciprocate within cylinder 36 and for sealing said piston with respect to the side walls of cylinder 36 the same is provided with an O-ring seal 44. The coil spring 45, having location between the top closure 38 and the piston 43, functions in a manner to maintain the piston in its down position. The stem 46 has a reduced end portion 47 which is threaded for receiving the nut 48 by means of which the stem and piston are fixedly connected together. The stem projects through the top closure 38 into the lower end of the tubular push rod support 40 and terminates adjacent the diametrically aligned slots 41. Since the piston and stem are adapted to reciprocate with respect to top closure 38 a bushing such as 49 may be provided for the stem.

The stem 46 is articulatedly connected to the sleeve 50 which has telescoping relation with the tubular push rod support 40. The connection between the stem and the sleeve is effected by means of a pin such as 51 which passes through aligned openings in the stem and sleeve and which has location within slots 41 in the support 40 so as to permit reciprocating movement of the pin in a vertical direction. Washers such as 52 are carried by the pin at its respective ends and the pin is retained in place by the cotter pins 53. The sleeve 50 therefore has vertical reciprocating movements as the piston 43 is caused to reciprocate. When air under pressure is admitted by the pipe 37 to within cylinder 36 and below the piston 43 therein the piston will be caused to move upwardly to the limit of its stroke and against the tension applied thereto by coil spring 45. This movement of the piston is transmitted by stem 46 and pin 51 to the sleeve 50 and thus the collet is locked to the push rod for actuating the strain gauges as will be clearly understood as the description proceeds.

The collet above referred to, and which is indicated in its entirety by numeral 55, consists of an elongated tubular member having the threads 56 at its lower end for threadedly securing the collet within the upper end of the tubular push rod support 40. The collet may be additionally held by the set screw 57 and the upper projecting end of the collet is formed to provide the wedge-shaped portions 58. Said upper projecting end of the collet is additionally provided with one or more slots such as 59 whereby said upper end is flexible and can be caused to contract for gripping the push rod 60 which depends from the box or container 61 comprising part of the gauging device and which is fixedly secured to the arm 24 of the welding machine.

The collet nut 62 is provided with threads 63 for connection with the sleeve 50, the nut having location within the upper end of the sleeve so as to project beyond the sleeve. Also it will be observed that nut 62 has encircling relation with the collet 55 and as a result of said encircling relation and the wedge portions 58 provided by the collet, it is only necessary to cause up and down movement of the collet nut to effect a gripping of the collet with the push rod 60 or a release of the collet from said push rod.

In Figure 2, the piston 43, stem 46, and sleeve 50 are shown in a down position. As a result thereof the collet nut 62 has an inoperative relation with the collet 55. In other words, the relation of the collet nut is such as to permit the collet to expand and when the parts are in this position the collet is released and there is no connection between the sleeve 50 and the push rod 60. However, in Figure 3, the piston has been elevated to the upper limit of its stroke. The stem 46 and sleeve 50 are also in "up" position and thus the collet nut has an operative relation with the collet. Accordingly the flexible upper end of the collet has been contracted to cause a gripping of the push rod 60 and the said push rod is thus connected to the sleeve, stem and piston.

The box 61 contains the deflection beam and strain gauges for transforming the upward movement of the push rod 60 into an electrical impulse. The box includes top and bottom plates 64 and 65, side plates 66, and end plates 67 and 68. By means of the threaded bolts 69 and bracket 70 the box is fixedly secured in desired vertical position on the upper arm 24 of the welding machine.

A lever identified in its entirety by numeral 71 is located within the box 61 and in accordance with the invention said lever may have any one of three different pivoted supports for changing the leverage ratio of the lever with respect to push rod 60. For the maximum leverage ratio the pivot support for the lever may be located at 72 which is adjacent the right hand end of the lever. For the minimum leverage ratio the pivot support may be located at 73 and for an intermediate adjustment said pivot support may be located at 74. The right hand end of the lever has associated therewith a coil spring 75 which is constructed and arranged to eliminate all looseness in the pivot supports for said lever. At its left hand end the lever is split as at 76 and at this end the lever carries the adjustable bolt 77 which depends through the opening 78 in the bottom plate 65, the said depending end being provided with head 79. It is possible to apply a wrench or other tool to head 79 and rotate bolt 77 to adjust its position with respect to lever 71. A stop member in the form of a threaded bolt 80 is provided by the bottom plate 65 and said member is held in desired position by the nut 81.

The push rod 60 extends through opening 82 in the bottom plate 65 and the end of the push rod having location within box 61 has connection with the lever 71. At the point of contact between the push rod and the lever there is located a hardened steel ball 83 which provides a bearing for eliminating substantially all friction during movement of the parts relative to each other. The push rod carries the pin 84 and which projects from the respective sides of the push rod. Each projecting end of the pin has connection with a coil spring such as 85 and 86, respectively, the said coil springs at their upper ends having location within recesses formed in the lever and being connected to the lever by means of the pins 87. The lever 71 is normally positioned in a horizontal plane, such as shown in both Figures 2 and 3, since the weight of the depending push rod 60 functions to hold the lever down against its stop 80. The adjustable bolt 77 is provided in order to transmit upward movements of the lever to the deflection beam 88. The said beam is formed of any suitable material and is supported by being held between the metal blocks 90 and 91 so as to provide a cantilever beam capable of deflecting to a considerable extent even though the forces applied thereto are relatively light. At the left hand end the cantilever beam 88 is reinforced on its undersurface by the block 92 and it will be observed that said block is in contact with the adjustable bolt 77.

Figure 4:
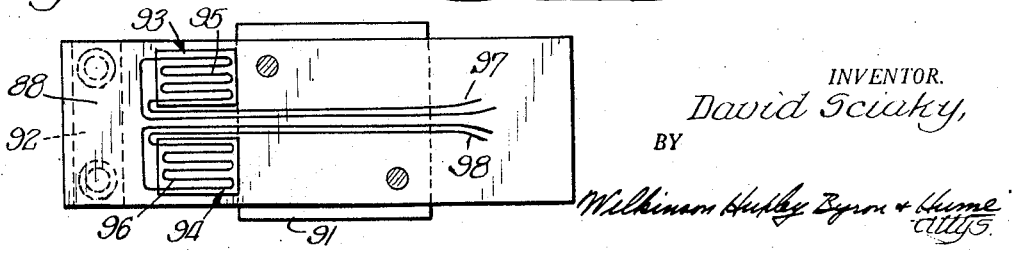
Figure 4 is a fragmentary view showing the deflection beam in top plan and illustrating the associated relation which the strain gauges have therewith.

Strain gauges are carried by the deflection beam 88 and these gauges have electrical connection in a circuit whereby the deflection of the beam is transformed into an electrical impulse. In Figure 4 the top side of the deflection beam 88 is illustrated as carrying a pair of compression strain gauges 93 and 94, the same consisting of a length of resistance wire 95 and 96, respectively, and which are connected in said electrical circuit by means of conductors 97 and 98. In a similar manner the deflection beam 88 carries on its underside a pair of tension strain gauges 100 and 101 and which respectively include the resistance wires 102 and 103, similarly connected in said circuit by means of the conductors 104 and 105. Upward movement of the push rod 60 such as may take place during a welding operation is accordingly transmitted to the pivot lever 71 and through the particular pivoting arrangement for the lever the movement of the adjustable bolt 77 will be materially increased. Upward movement of the adjustable bolt 77 is applied directly to the deflection beam 88 and, as previously explained, said beam through the strain gauges transforms the movement into an electrical impulse. The electrical impulse is used to actuate the sensitive galvanometer of a recording oscillograph as disclosed in Figure 5. The electrical impulse may also be used to energize certain lights as illustrated in Figures 6 and 7 so that the operator can be informed as to whether a good or a bad weld has been produced.

The resistance wires 95 and 96 for the compression strain gauges are connected in a bridge circuit as shown in Figure 5 so as to form two opposite legs of the bridge. The resistance wires 102 and 103 of the tension strain gauges are likewise connected in the bridge circuit so as to form the other two opposite legs of the bridge. A low resistance potentiometer 106 is employed, as shown, to provide a zero set for initially balancing the bridge when the deflection beam is horizontally positioned, or, in other words, when the beam is not deflected. The bridge is powered by means of a direct current battery 107 having connection to the electrical bridge circuit through the pointer 108 of the potentiometer and terminal 110 located between the resistance wires 95 and 103. The output of the bridge circuit is electrically connected by means of the conductors 111 and 112 to a sensitive galvanometer 113 mounted in a recording oscillograph.

Figure 8 is a reproduction of a typical oscillogram taken during the welding of overlapping aluminum plates identified as 24 ST .080 gauge. The recorded deflection of the galvanometer needle which produced the graph 114 shows a deflection of about 37.9 millimeters which indicates a good weld wherein the electrode 14 had upward movement of approximately .012 of an inch. The secondary welding current is shown by the graph 115.

Figures 6 and 7 are illustrative of circuit connections which may be used for causing the electrical impulse to energize certain lights whereby the operator receives an indication as to the quality of the welded joint. The bridge circuit of Figure 6 has an additional output circuit in electrical connection therewith. The conductors 116 and 117 have connection with the input terminals of a voltage amplifier designated by numeral 118. The output terminals of said voltage amplifier are fed into the grid-cathode circuits of gas-filled thyratron tubes 120 and 121. More particularly the conductor 122 from the output side of the voltage amplifier 118 has electrical connection with the potentiometer 123 having the direct current battery 124 connected across the respective ends thereof with polarities as shown. The pointer 125 of said potentiometer 123 is connected to the grip 126 of the tube 120. The tube 120 also includes the cathode 127 having connection at 128 with conductor 130 connecting with the other outlet terminal of the voltage amplifier. The plate 131 of said tube 120 is connected in circuit with the low limit relay 132, the normally closed contactor 133, and the direct current battery 134. The conductor 122 also has electrical connection with a second potentiometer 139 and which has the direct current battery 135 in shunt relation therewith and with the polarities as shown. The pointer 136 of the potentiometer 139 connects with the grid 137 of tube 121. The cathode 138 of said tube is electrically connected to point 128 and the plate 140 of the tube is connected in circuit with the high limit relay 141, the normally closed contactor 133, and the direct current battery 134. The grid 126 has a bias voltage applied thereto by adjustment of potentiometer 123 such as to form a low limit for the output amplifier so that an output voltage of minimum value will trigger the tube 120 to cause conduction through said tube and current flow through the low limit relay 132. On the other hand, the grid 137 has a bias voltage applied thereto by adjustment of potentiometer 139 such that the output voltage from the voltage amplifier must be above a predetermined maximum in order to render tube 121 conductive and thus energize the upper limit relay 141. The contactor 133, actuated by relay 142, must be closed in order for the tubes 120 and 121 to conduct. Upon completion of the welding operation and after an indication has been secured as to the quality of the welded joint, contractor 133 can be opened, thus terminating the conduction of the said tubes.

In accordance with the invention the energization of relay 132 and relay 141 is employed to light certain bulbs or lamps and which are so constructed and arranged as to indicate to the operator the welds which are within the range of good welds and also those which may be outside of the said range. The conductors $L_1$ and $L_2$ indicate the terminals of a source of alternating current and across said source there is provided three electrical circuits, each circuit including a lamp for indicating purposes. The first circuit, including lamp 143 and filament 144, is electrically connected across said source by conductor 145 and by the normally closed contactor 146. Said normally closed contactor is actuated by the low limit relay 132. The second circuit, including the lamp 147 having filament 148, is electrically connected across said alternating current source by conductor 150, by the normally closed contactor 151 and by the normally open contactor 152. Contactor 152 is actuated by relay 132, whereas contactor 151 is actuated by the high limit relay 141. The third circuit includes the lamp 153 having filament 154 and which is electrically connected across said source by conductor 155 and by the normally open contactor 156 which is actuated by the high limit relay 141.

The first step in the operation of the resistance welding machine is to space the electrodes to permit insertion of the workpieces. Accordingly, the required upward movement is imparted to the horizontal plate 27 and to the parts attached thereto by movement of the plunger 26 and this is effected by supplying a pressure medium to the head 25 below the piston therein. The workpieces may now be placed between the electrodes and the next step in the welding procedure is to apply a pressure medium to the head 25 above the piston, allowing the pressure medium below the piston to exhaust, and the operation is continued until a clamping pressure of considerable magnitude is effected to provide good electrical contact at the interface of the workpieces. This maximum pressure may be reduced to a predetermined extent according to conventional welding procedures and when the reduced pressure has stabilized the welding current may be applied.

During this spacing of the electrodes and during down movement thereof for clamping the workpieces between said electrodes it will be understood that the gauging device remains inoperative since during these preliminary steps in the welding process the piston 43, stem 46, and sleeve 50 are located in the down position of Figure 2. Thus the collet is free as regards the push rod 60 and said piston, stem and sleeve may have up and down movement conforming to that of the horizontal plate 27 but which movements are not imparted to the push rod 60. In other words, the collet of the gauging device remains inoperative as long as piston 46 is in its down position. After the said reduced pressure on the workpieces has become stabilized and immediately in advance of the welding step a pressure medium is admitted through the supply pipe 37 to within cylinder 36 and below the piston 43 to cause said piston to move into its "up" position, as shown in Figure 3. The admission of the pressure medium for actuating piston 43 is preferably synchronized with the other steps in the welding procedure. The upward movement of piston 43, stem 46, and sleeve 50 so locates the collet nut 62 with respect to collet 55 that the collet is caused to grip the push rod and thus the gauging device is rendered operative.

The next step in the welding process is the application of the welding current to the workpieces and during the weld period heating of the metal of said workpieces takes place and eventually a mass of metal constituting the weld nugget begins to melt and thus changes its state from a solid to a liquid. This liquid weld metal exerts a force which together with the normal expansion of the heated solid metal produces an upward movement of the movable electrode 14. Although this upward movement of the movable electrode is quite rapid, nevertheless the same is substantial in magnitude and since all parts of the gauging device are located together to form a unitary structure the said upward movement is transmitted to the push rod 60 and to the lever 71 to cause pivoting of the same in a clockwise direction. Any one of the pivot supports may be used either 72, 73 or 74, depending on the lever ratio desired. The pivoting movement of lever 71 is transmitted through the adjustable bolt 77 to the deflection beam 88 and thus the strain gauges 93 and 94 are placed in compression, whereas the strain gauges 100 and 101 are placed in tension. As a result of the deflection of beam 88 an output voltage is produced by the bridge circuit, which includes the strain gauges as elements thereof, and the magnitude of this output voltage will depend on the extent of beam deflection. An upper stop is provided by the adjustable screw 89, Figures 2 and 3, in order to limit upward movement of the beam so that it will not be strained beyond the limit of proportionality.

The output current from the bridge circuit may be utilized to obtain an indication of the deflection on a recording oscillograph, all as explained in connection with Figure 5, and also the circuits of Figures 6 and 7 may be utilized to obtain visual indications of the weld quality. When said output voltage is below a predetermined low limit and thus not sufficient to effect conduction of tube 120, it will be understood that relay 132 is not energized and thus the signal lamp 143 remains in circuit and upon closing of the switch 158 the filament 144 will be supplied with current so that the lamp will glow, thus giving the operator an indication that the weld did not come up to specifications and that a bad weld has been produced. However, if the output voltage from the bridge circuit is above the predetermined low limit but below a predetermined maximum, then the tube 120 will be caused to conduct but the tube 121 will remain nonconductive. With current flow through tube 120 taking place relay 132 will be energized and contactor 146 will be opened, whereas contactor 152 will close. With contactor 151 remaining closed the circuit for the lamp 147 is complete and filament 148 will glow when the switch 158 is closed. Thus the operator is given a signal by lamp 147 which is an indication that a good weld has been produced. In the event the output voltage from the bridge circuit is above the predetermined maximum, then it will be understood that tube 120 and tube 121 will both be caused to conduct and relays 132 and 141 will be energized. Relay 132 will open contactor 146 but will close contactor 152. However, energization of relay 141 will open contactor 151 and close contactor 156. Accordingly, the lamp 153 is the only lamp in circuit and upon closing of switch 158 the filament will glow to thus inform the operator that the weld produced is excessive in size, or, in other words, has exceeded the specifications for a good weld and is outside of the range.

The adjustments for the potentiometers 123 and 139 are based on the voltage outputs of the particular bridge circuit for standard welds, or, in other words, for welded joints coming within the desired range. The low limit of said range provides the adjustment for tube 120, whereas the upper limit for the range provides the adjustment for the tube 121. Also instead of lamps which give visual indications it is possible to use bells or other indicators as may be desired.

The circuit connections as shown in Figures 10 and 11 include the feature whereby the welding machine is locked in "hold" position following the production of a bad weld and wherein a counter is provided for recording the number of bad welds. The indicating lamps 143, 147 and 153 are connected in Figure 10 in parallel circuit relation the same as disclosed and explained for Figure 7. The only additional element incorporated in the circuit comprises the relay 160 connected in shunt across the lamp 147. This relay will therefore be energized along with the lamp 147 each time the machine produces a weld which is within the range of good welds. This energization of relay 160 is used to release or free the welding machine for another welding operation and accordingly when relay 160 is not energized the welding machine will automatically be locked in a "hold" position.

Referring in particular to Figure 11, wherein the several elements and relay means for the welder are diagrammatically shown, the source of electrical current is represented by conductors $L_1$ and $L_2$ and the conductor 161 connects the foot pedal 162 and the relay 163 in circuit across the source. The contactor 164 is connected in shunt relation across the foot pedal and the contactor 164 and also contactor 165 are both normally open, being actuated into a closed position when relay 174 is energized. Likewise the energization of relay 163 will cause a closing of the two normally open contactors 166 and 167. Contactor 166 is in series with the normally closed contactor 168 and the solenoid 170, which, when energized, effects actuation of the valve through which compressed air is allowed to enter the cylinder head 25 of the welding machine to cause the electrodes to grip and apply pressure to the overlapping workpieces located therebetween. Contactor 168, which is actuated by relay 183, is operatively connected to the normally open contactor 171.

When contactor 167 closes it initiates operation of the squeeze timer 172, located in the same circuit therewith and with the normally closed contactor 173 and the relay 174. After a preset time interval controlled by operation of the squeeze timer 172 the relay 174 will be energized and contactors 164 and 165 will move into a closed position. The operator can now lift his foot from foot pedal 162 and the welding machine will continue in operation until a complete cycle of events has taken place. Closing of contactor 165 will effect initiation of the weld timer 175 and following a preset interval of time, controlled by the said weld timer, relay 176 will be energized. Initial energization of the weld timer 175 will start the flow of welding current and when relay 176 is energized the flow of welding current is terminated. During the welding the circuit of Figure 6 has been operative and relays 132 and 141 are either energized or not, depending upon the condition of the weld.

Relay 176 controls the operation of three normally open contactors, namely, 177, 178 and 180. Relay 177 is located in the circuit of Figure 10 and is positioned in conductor $L_1$ so as to control the supply of electrical energy to the indicating lamps. Contactor 178 is in series with the normally open contactor 181 and with the hold timer 182 and relay 183. Here again the hold timer will operate to hold the electrodes in their welding position, for a preset time interval following the termination of the weld operation, before relay 183 is energized to terminate the "hold" time. Energization of the relay 183 will actuate the contactors 168 and 171, causing the former to open and the latter to close. Accordingly the off timer 184 is energized to begin its operation and simultaneously therewith the circuit to solenoid 170 is interrupted, thus deenergizing the solenoid and allowing the air valve leading to cylinder head 125 to open. The electrodes can now be withdrawn from the workpiece and this operation will take place after a time interval controlled by the off timer 184 in energizing the relay 185. The off timer has associated therewith the release switch 186, having location in conductor 187 connected in shunt relation across the said timer. It will be understood that upon closure of switch 186 relay 185 will be energized independently of the timer and contactor 173 is thus caused to open to discontinue the squeeze operation and permit the electrodes to be withdrawn.

Referring again to contactor 181, located in series with the hold timer 182, it will be seen that said contactor is energized by the relay 160. Upon the production of a good weld the lamp 147 is energized and simultaneously therewith relay 160 will be energized to cause contactor 181 to close and to open contactor 188. Accordingly, following the production of a good weld the circuit to hold timer 182 is closed and the welding machine operates in a proper manner to complete its full sequence of events, with the electrodes eventually being withdrawn from the welded workpiece. However, in the event of a bad weld, relay 160 will not be energized and thus contactor 181 will remain open and contactor 188 will remain closed. When this takes place the hold timer 182 is not energized and the welding machine is locked against further operation with the electrodes under pressure. However, since relay 176 was previously energized it will be understood that contactor 180 was caused to close. This closing of contactor 180 will initiate actuation of the time delay device 190 in circuit with contactor 180 and the relay 191. The time delay device 190 is necessary in order to insure that the counter 192 will not be energized before relay 160 is energized. Relay 191 controls the normally open contactor 193 and when said contactor is closed counter 192 is energized to count the bad weld since under these conditions contactor 188 of course remains closed. In order to release the locked welding machine following a bad weld it is necessary for the operator to close release switch 186 and relay 185 will be energized to deenergize the squeeze timer and effect withdrawal of the electrodes from the workpiece, whereupon the welding machine is reset and ready for another operation.

The invention is not to be limited to or by details of construction of the particular embodiment thereof illustrated by the drawings, as various other forms of the device will of course be apparent to those skilled in the

What is claimed is:

1. In apparatus for determining the quality of resistance welded joints, the combination with a welder having a fixed and a movable electrode for clamping a workpiece therebetween, of an electric circuit including a plurality of indicating means capable of indicating whether the welded joints come within the range of good welds or whether said welded joints are below or above said range, a deflection beam carrying a plurality of strain gauges, a bridge circuit including said strain gauges as elements thereof and which is capable of producing an output voltage proportional in magnitude to the deflection of said beam, a gauging device for deflecting said beam during the welding step, said gauging device producing beam deflection as a result of upward movement of the movable electrode due to the expansion of the welded joint which takes place during the welding step, and means delivering said output voltage to the electric circuit for selectively energizing the indicating means thereof.

2. In apparatus for determining the quality of resistance welded joints, the combination with a welder having a fixed and a movable electrode for clamping a workpiece therebetween, of an electric circuit including a plurality of visual indicating means capable of respectively indicating whether the welded joints come within the range of good welds or whether the welded joints are below or above said range, a cantilever providing a deflection beam and which carries a plurality of strain gauges, a bridge circuit which includes said strain gauges as elements thereof and which is capable of producing an output voltage proportional in magnitude to the deflection of said beam, a gauging device for deflecting said beam during the welding step, means mounting said gauging device on the movable electrode, whereby said device produces beam deflection as a result of upward movement of the movable electrode due to the expansion of the welded joint which takes place during the welding step, and means delivering said output voltage to the electric circuit for selectively energizing the indicating means thereof.

3. In apparatus for determining the quality of resistance welded joints, the combination with a welder having a fixed and a movable electrode for clamping a workpiece therebetween, of an electric circuit including a plurality of indicating means for respectively indicating whether the welded joints come within the range of good welds or whether the welded joints are below or above said range, a deflection beam, a pair of strain gauges fixed to the top surface of said beam and adapted to be placed in compression upon deflection, a pair of strain gauges fixed to the bottom surface of the beam and adapted to be placed in tension upon deflection, a bridge circuit which includes said strain gauges as elements thereof and which is capable of producing an output voltage proportional in magnitude to the deflection of said beam, a gauging device for deflecting said beam during the welding step, said gauging device producing beam deflection as a result of upward movement of the movable electrode due to the expansion of the welded joint which takes place during the welding step, and means delivering said output voltage to the electric circuit for selectively energizing the indicating means thereof.

4. In apparatus for determining the quality of resistance welded joints, in combination with a welder having a fixed and a movable electrode for clamping a workpiece therebetween, of an electric circuit including a plurality of lamps connected in shunt relation with respect to each other, a deflection beam carrying a plurality of strain gauges, a bridge circuit including said strain gauges as elements thereof and which is capable of producing an output voltage proportional in magnitude to the deflection of said beam, a gauging device for deflecting said beam during the welding step proportional to the expansion of the welded joint which takes place during the welding step, and a plurality of relay means for selectively controlling the energization of the lamps in response to the magnitude of the output voltage, whereby said lamps are capable of indicating whether the welded joints come within the range of good welds or whether said welded joints are below or above said range.

5. In apparatus for determining the quality of resistance welded joints, in combination with a welder having a fixed and a movable electrode for clamping a workpiece therebetween, of an electric circuit including a plurality of lamps connected in shunt relation with respect to each other, a cantilever providing a deflection beam, a pair of strain gauges carried by said beam on the top surface thereof and which are placed in compression upon deflection, a pair of strain gauges carried by the beam on the bottom surface thereof and which are placed in tension upon deflection, a bridge circuit which includes said strain gauges as elements thereof and which is capable of producing an output voltage proportional in magnitude to the deflection of said beam, a gauging device for deflecting said beam during the welding step, means mounting said gauging device on the movable electrode, whereby said device produces beam deflection as a result of upward movement of the movable electrode due to the expansion of the welded joint which takes place during the welding step, and means delivering said output voltage to the electric circuit, said means including electrical relay devices for selectively controlling the energization of the lamps in response to the magnitude of the output voltage, whereby said lamps are capable of indicating whether the welded joints come within the range of good welds or are outside said range.

6. In apparatus for determining the quality of resistance welded joints, in combination with a welder having a fixed and a movable electrode and incorporating means for reciprocating the movable electrode for clamping a workpiece between the electrodes, of an electric circuit including a plurality of indicating means capable of respectively indicating whether the welded joint is below standard, within the range of good welds or is above standard, a deflection beam having a plurality of strain gauges mounted thereon, a bridge circuit including said strain gauges as elements thereof and which is capable of producing an output voltage proportional in magnitude to the deflection of said beam, a gauging device for deflecting said beam and which is mounted on the movable electrode, means for rendering the gauging device operative during the welding step whereby the device produces beam deflection as a result of upward movement of the movable electrode due to the expansion of the welded joint which takes place during said welding step, and other means for delivering said output voltage to the electric circuit for selectively energizing the indicating means thereof.

7. In apparatus for determining the quality of resistance welded joints wherein a fixed electrode and a movable electrode clamps a workpiece therebetween, of a deflection beam having a plurality of strain gauges mounted thereon, a bridge circuit including said strain gauges as elements thereof and which is capable of producing an output voltage proportional in magnitude to the deflection of said beam, a gauging device for deflecting said beam and which is mounted on the movable electrode, means for rendering said device operative during the welding step whereby the device produces beam deflection as a result of upward movement of the movable electrode due to the expansion of the welded joint which takes place during said welding step, an electric circuit in connected relation with the bridge circuit for receiving said output voltage, said electric circuit including a low limit indicator, a high limit indicator and an intermediate limit indicator, and relay devices having selective actuation in response to the magnitude of the output voltage for energizing said indicators.

8. In apparatus for determining the quality of resistance welded joints, the combination with a welder having a fixed and a movable electrode for clamping a workpiece therebetween, of an electric circuit for the welder, said circuit including control means for controlling the sequence of operations in producing a welded joint, an auxiliary electric circuit including a plurality of indicating means for respectively indicating whether the welded joints come within the range of good welds or whether the welded joints are below or above said range, relay means connected in said auxiliary circuit in shunt relation with that indicating means which indicates good welds, whereby the relay means is energized simultaneously with the energization of said indicating means, a cantilever providing a deflection beam and which carries a plurality of strain gauges, a bridge circuit which includes said strain gauges as elements thereof and which is capable of producing an output voltage proportional in magnitude to the deflection of said beam, a gauging device for deflecting said beam during the welding step, means mounting said gauging device on the movable electrode so that said device produces beam deflection as a result of upward movement of the movable electrode due to the expansion of the welded joint which takes place during the welding step, means delivering said output voltage to the electric circuit for selectively energizing the indicating means thereof, and an electrical contactor actuated upon energization of the relay means and having operative association with the control means for the welder, whereby the welder is locked against operation following the production of a bad weld.

References Cited in the file of this patent

UNITED STATES PATENTS

| | | |
|---|---|---|
| 1,967,094 | Lincoln | July 17, 1934 |
| 2,377,601 | Bayles | June 5, 1945 |
| 2,472,368 | Cox et al. | June 7, 1949 |
| 2,677,271 | Faris et al. | May 4, 1954 |